US006411251B2

United States Patent
Stanek et al.

(10) Patent No.: US 6,411,251 B2
(45) Date of Patent: Jun. 25, 2002

(54) METHOD FOR MEASUREMENT OF THE RADAR TARGET CROSS SECTION OF AN OBJECT WITH BOTH MOVING AND FIXED PARTS

(75) Inventors: Tomas Stanek, Mölndal; Roland Jonsson, Göteborg; Jan Hagberg, Mölnlycke, all of (SE)

(73) Assignee: Telefonaktiebolaget LM Ericsson (publ), Osaka (JP)

( * ) Notice: Subject to any disclaimer, the term of this patent is extended or adjusted under 35 U.S.C. 154(b) by 5 days.

(21) Appl. No.: 09/731,694

(22) Filed: Dec. 8, 2000

(30) Foreign Application Priority Data

Dec. 14, 1999 (SE) ................................................ 9904558

(51) Int. Cl.[7] ........................... G01S 13/00; G01S 13/08
(52) U.S. Cl. ........................ 342/90; 342/128; 342/130; 342/192
(58) Field of Search ........................... 342/90, 128–132, 342/192, 193

(56) References Cited

U.S. PATENT DOCUMENTS

| 3,603,989 A | * | 9/1971 | Caspers | 343/5 |
| 4,920,347 A | | 4/1990 | Kurihara | 342/130 |
| 5,055,848 A | * | 10/1991 | Rotgans | 342/90 |
| 5,347,282 A | | 9/1994 | La Grange et al. | 342/193 |
| 5,376,940 A | * | 12/1994 | Abatzoglou | 342/192 |
| 6,222,481 B1 | * | 4/2001 | Abrahamson et al. | 342/90 |

FOREIGN PATENT DOCUMENTS

FR 2 738 350 A1 3/1997

* cited by examiner

Primary Examiner—Thomas H. Tarcza
Assistant Examiner—Brian Andrea
(74) Attorney, Agent, or Firm—Nixon & Vanderhye, P.C.

(57) ABSTRACT

The invention relates to a method for measurement of the radar target cross section of an object with both moving and fixed parts, which method comprises a first measurement with high frequency resolution, from which information can be extracted on modulations in the signal received that derive from moving parts of the object and fixed parts of the object respectively. The invention is characterized in that the method comprises a second measurement with high range resolution, and filtering of the measuring result obtained from the second measurement, which filtering is performed around a certain frequency that is obtained by means of the measuring result from the first measurement.

The first measurement is preferably given a high frequency resolution in that it is performed with a narrow-band waveform, and the second measurement is suitably given a high range resolution in that it is performed with a broadband waveform.

4 Claims, 4 Drawing Sheets

METHOD FOR MEASUREMENT OF THE RADAR TARGET CROSS SECTION OF AN OBJECT WITH BOTH MOVING AND FIXED PARTS

TECHNICAL SPHERE

The present invention relates to a method for measurement of the radar target cross section of an object with both moving and fixed parts. One conceivable such object are jet aircraft, in which the moveable parts primarily consist of moving parts of the jet engine, and the fixed parts of the object primarily consist of the aircraft fuselage.

PRIOR ART

In theoretical calculations of the radar target cross section of an object it can be very difficult to take proper account of the effect of parts of the object that move in operation. An example of objects with parts that move in operation are jet aircraft, in which the moving parts consist chiefly of the so-called blades in the various compressor stages of the jet engine.

In measurements of the radar target cross section of a jet aircraft in operation, so-called dynamic measurement, the moving parts will generate modulations in the signal received. The said modulations are of a nature such that they make it more difficult to extract data from the measurements concerning the radar target cross section of other parts of the aircraft, since the dispersion and radar target cross section that derive from the said modulations are very difficult to calculate or measure with stationary measuring equipment.

There is a need therefore, when measuring the radar target cross section of an object with both moving and fixed parts, for a method of distinguishing the modulations in the signal received that derive from moving parts of the object and from fixed parts of the object respectively.

DESCRIPTION OF THE INVENTION

The present invention solves the problem, when measuring the radar target cross section of an object with both moving and fixed parts, of being able to distinguish the modulations in the signal received that derive from moving parts of the object and from fixed parts of the object respectively.

This problem is solved by a method that comprises a first measurement with high frequency resolution, from which information can be extracted on the modulations of the signal received that derive from moving parts of the object and from fixed parts of the object respectively, and a second measurement with high range resolution. The measuring result obtained from the second measurement is filtered around a certain frequency, which is obtained by means of the measuring result from the first measurement.

Since the first measurement has good frequency resolution it is possible to extract information on modulations of the signal received that derive from moving parts of the object and from fixed parts of the object respectively. The fact that the second measurement has high resolution in the range direction means that the measuring result from the second measurement can be used to determine the target cross section of different parts of the object.

Owing to the moving parts in the object, data from the measurements will contain modulations at a large number of frequencies. The frequency of the modulations in the second measurement that derive from that part of the aircraft, the target cross section of which it is wished to calculate, is obtained by means of measuring results from the first measurement, following which the desired measuring results from the second measurement can be filtered out and used for further processing, for example in order to distinguish target cross sections that derive from moving parts from target cross sections that derive from fixed parts of the object.

DESCRIPTION OF FIGURES

The invention will be described in more detail below with the aid of examples of embodiments and with reference to the drawings attached, in which.

DESCRIPTION OF EMBODIMENTS

Figure 1:
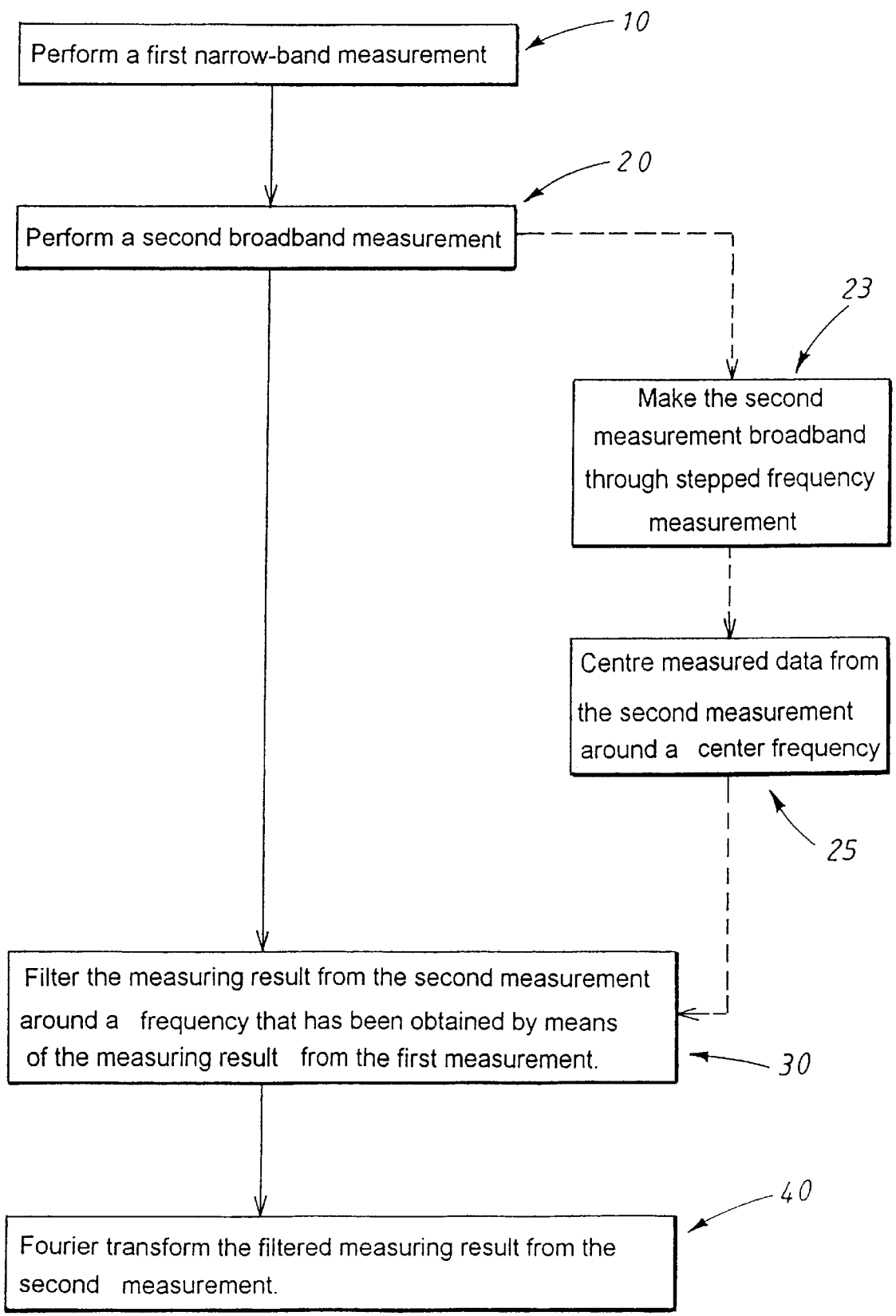
FIG. 1 shows a flow chart of the invention.

FIG. 1 shows a basic flow chart for a method according to the invention. As will be seen from this flow chart, according to the invention a first narrow-band radar measurement (box 10 in the flow chart) is performed against the object in question, with the object in motion.

In order to give measured data from this measurement the desired information content, the first measurement is preferably performed with a waveform, which has a relatively long measuring time and high pulse repetition frequency (PRF). Measuring times in the interval 20<<200 milliseconds have proved to give good results, and a preferred measuring time in this interval is 100 milliseconds. A suitable order of magnitude for the PRF is 50 kHz.

The object may be a jet aircraft, for example, and due to the fact that the aircraft is in motion during the measurement, moving parts of the aircraft, primarily moving parts of its engine, will give rise to a number of different modulations at different frequencies in the measured data that are obtained. An example of how results of such a measurement may look is shown in FIG. 2.

Figure 2:
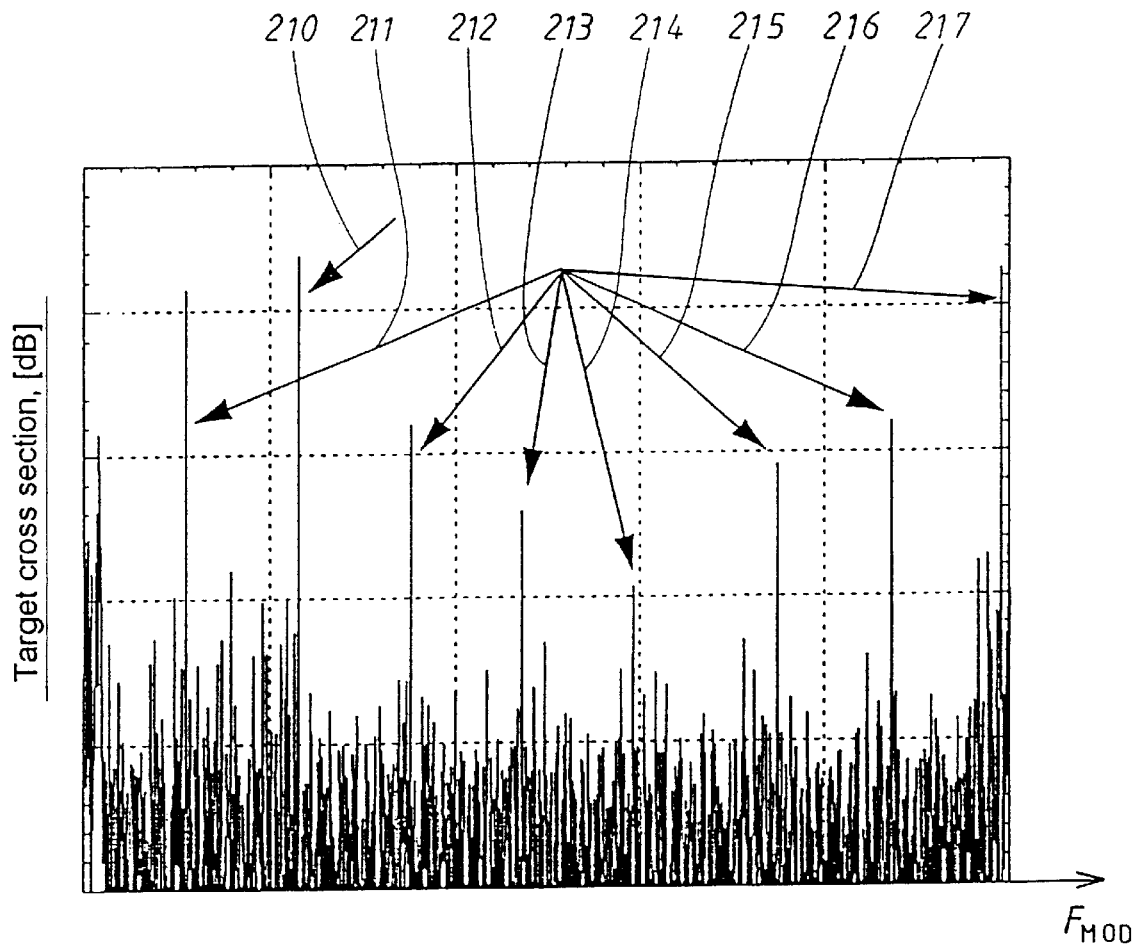
FIG. 2 shows the results of a first measurement according to the invention.

As can be seen from FIG. 2, the measuring results from the first measurement consist of a so-called modulation spectrum with a number of tones or "spikes" caused by the aircraft fuselage and the moving parts of the aircraft engine resoectively. The spike that derives from the fuselage has been given the reference number 210 in FIG. 2, and the spikes that derive from moving parts in the engine have been given the reference numbers 211–217. It should be pointed out that the modulation spectrum contains more spikes caused by moving parts of the target than those numbered in FIG. 2, and just how the spike that derives from the fuselage can be identified will be explained later in this description. As will also be seen from FIG. 2, all spikes occur at multiples of one and the same frequency interval from the spike caused by the aircraft fuselage. How these facts are exploited according to the invention will be seen later in the description.

Figure 3:
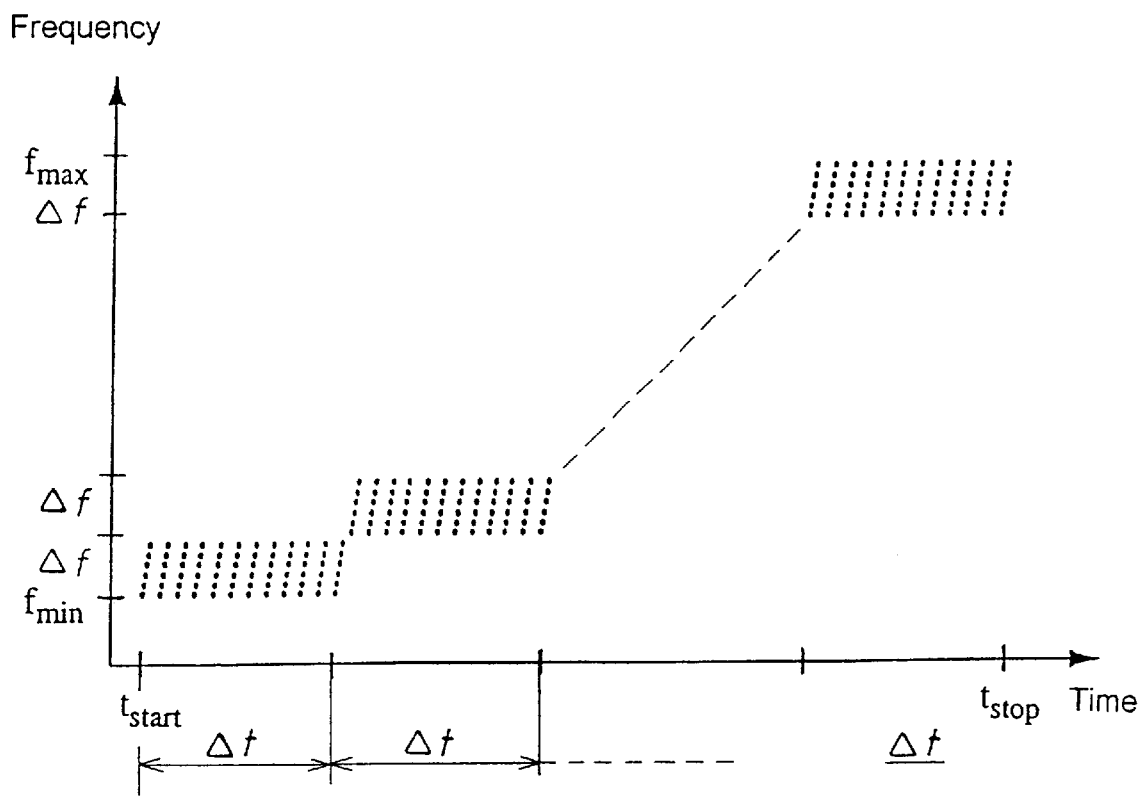
FIG. 3 shows a conceivable transmission pattern for the second measurement according to the invention.

After the first narrow-band measurement, a second measurement (box 20 in the flow chart), which is broadband, is performed over a relatively short measuring time. There are a number of principles for carrying out such a measurement, one of which is given in box 23 in the flow chart in FIG. 2 and shown in FIG. 3. As will be seen from FIG. 3, the measurement is carried out according to this principle in such a way that a number (N) of pulses at each of a number of different frequencies within an interval $f_{min}$–$f_{max}$ are transmitted during a measuring period $t_{start}$–$t_{stop}$. During a partial period $\Delta t$ within the interval $t_{start}$–$t_{stop}$ a number of pulses are transmitted in a partial interval $\Delta f$ within the frequency interval $f_{min}$–$f_{max}$. Each pulse is followed by a pulse with higher frequecy, until the highest frequecy within the interval $\Delta f$ has been reached, at which point the process recommences at the lowest frequency within the interval.

When the number N of pulses at each frequency has been transmitted within the interval $\Delta f$, in other words after the time $\Delta t$, a new sequence is begun in the next frequency interval $\Delta f$. This process is repeated up to the time $t_{stop}$, at which point N st pulses have been transmitted at the frequency $f_{max}$.

The rate at which the pulses are transmitted is determined by the desired characteristics of a number of different factors in the measurement in question, for example band width, the range clarity, measuring time, filtering characteristics and frequency repetition frequency. Frequency repetition frequency relates to the frequency with which a certain transmission frequency re-occurs. The interval $t_{start}$- $t_{stop}$ should be designed so that the aircraft does not have time to alter speed or acceleration during the course of the measurement.

Since the second measurement according to the method described above will contain information on a large number of frequencies, there is a need to centre the measuring results around one frequency (box 25 in the flow chart). This is suitably achieved by multiplying the measured signal for each pulse by a function $s(f_k,t_k)$:

$$s(f_k, t_k) = e^{\frac{j4\pi f_k R(t_k)}{c}} \quad (1)$$

The formula (1) is suitably approximated by the following formula:

$$S(f_k, t_k) = e^{\frac{j\pi f_k (R_0 + vt_k + 0.5at_k^2)}{c}} \quad (2)$$

In the formulae above v is the radial velocity of the target in relation to the measuring radar, a is the radial acceleration of the target, index h represents the pulse that is transmitted at the frequency $f_k$ at the time $t_k$, c is the speed of light, and $R(t_k)$ is the distance to the target at the time $t_k$. $R(t_k)$ may also be approximated according to:

$$R(t_k) = R_0 + vt_k + 0.5at^2_k \quad (3)$$

In the formula (3), v and a are assumed to be constant throughout the measurement.

Figure 4:
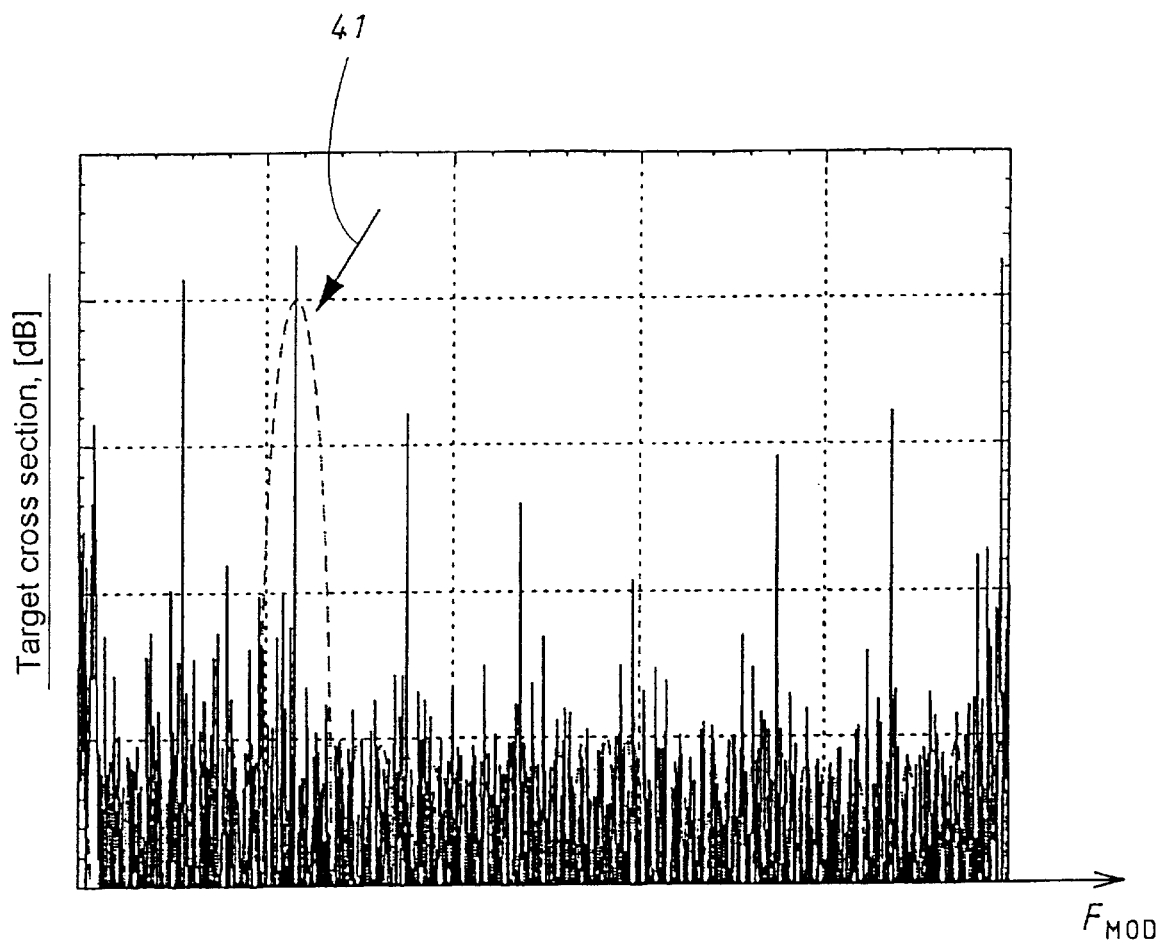
FIG. 4 shows filtering of measuring results from the second measurement.

Following the abovementioned centring according to the formula (2), measured data from the second measurement will thus be centred around the same central frequency, and will have a fundamental appearance according to that shown in FIG. 4.

In the flow chart in FIG. 1, the arrows from box 20 to boxes 23, 25 and 30 have been drawn with dashed lines in order to indicate that the method for making the second measurement broadband that has been described above, and is described in boxes 23 and 25, is only one of many methods of performing a broadband measurement. Examples of other methods will be given later in the text.

The problem to be solved according to the invention is to distinguish the modulations in the signal received that derive from the moving parts of the object and the fixed parts of the object respectively. According to the invention this is done by determining the modulation frequency from the fuselage echo with the aid of measured data from measurement 1. Any ambiguities between the modulation frequency from the fuselage echo and modulation frequencies from the moving parts of the engine can be decided by means of information on the speed of the aircraft, on the basis of which it is possible to determine the so-called Doppler frequency that corresponds to the speed of the target. Such information can be obtained from a number of different sources, for example from a so-called tracking function in the radar with which the measurement according to the invention is carried out.

When the modulation frequency that corresponds to the fuselage echo has been determined the other parts of the modulation spectrum can be suppressed, filtered (box 30 in the flow chart in FIG. 1) so that essentially only data that correspond to the fuselage of the target remain. This is suitably achieved by means of a so-called bandpass filter. Such a filter may be designed in a large number of ways familiar to the person skilled in the art, and will therefore not be further described here. In FIG. 4 an example 41 of the filter characteristic of a bandpass filter has been inserted around the spike from the fuselage echo. After bandpass filtering the information from the fuselage echo may be used for further analysis of the radar target cross section of the aircraft, by analysing the information in the range direction. Analysis in the range direction may be performed, for example, by transforming the information from the echo with the aid of Fourier analysis (box 40 in the flow chart), which is suitably undertaken with the aid of so-called fast Fourier transform (FFT).

In other words Fourier transformation provides measured data in the range direction rather than in the frequency direction, which is advantageous when analysing the radar target cross section of the object, and facilitates comparison with the calculated radar target cross section of the object. On the basis of this comparison it is then possible to examine whether the calculations of the radar target cross section of the target have been correct.

Since the tones from the engine and the fuselage echo occur separately in the modulation spectrum it is also possible to use a method according to the invention in order to filter out tones that originate from the engine, in order then to use the information contained in the said tones. The spikes in the modulation spectrum that are caused by moving parts of the engine can be located since they occur at multiples of one and the same frequency interval from the spike caused by the aircraft fuselage. The items of information in the tones from the engine may be used either separately, or in combination with one another or, for example, in combination with information from the fuselage echo.

Calculating the target cross section for the moving part in the engine that has caused the filtered-out tone(s) by means of Fourier analysis is one example of how information from the engine tones can be used. Tone "number 1", the engine tone having the highest amplitude, will have its equivalent in the first compressor stage of the engine.

By using Fourier analysis, for example, to generate target cross section profiles for one or more engine tones it is also possible to determine the position in the target cross section profile for a reference point on the leading edge of the engine. If a target cross section profile for a moving radar target affected by moving parts has been generated or calculated, the said reference point may be used for comparison with a target cross section profile that substantially derives only from the fuselage of the target, in other words non-moving parts of the target.

The reference point with regard to the leading edge of the engine serves for optimal identification of the points that correspond to one another in the two target cross section profiles. Once the points have been identified a correlation can be made between the two target cross section profiles. One sphere of application for such correlations is the identification of aircraft or other types of vehicle or craft, on the basis of a library, which contains target cross section profiles without the effect of moving parts for known aircraft, vehicles or craft. Obviously the reverse is also conceivable, in other words the library might contain data on the radar target cross section of the target with the effect of moving parts and a comparison made with the measuring result in which the effect of moving parts does not figure.

The invention is not limited to the examples described above, but is freely adaptable within the scope of the claims below. For example, a method has been described above for making the second measurement according to the invention broadband. Broadband measurements, however, can be carried out by a number of other methods that can be applied within the scope of the present invention. Two such methods that might be mentioned are short pulses or phase-coded pulses, for example so-called chirp or binary coding. The essential feature is that the frequency repetition frequecy is high enough to permit spectral division or filtering of the signal received, so that the fuselage echo can be separated from the engine tones and also from tones caused by clutter.

What is claimed is:

1. A method for measurement of the radar target cross section of an object with both moving and fixed parts, which method comprises a first measurement with high frequency resolution, from which information can be extracted on modulations in the signal received that derive from moving parts of the object and fixed parts of the object respectively, characterized in that the method furthermore comprises a second measurement with high range resolution, filtering of the measuring result obtained from the second measurement, which filtering is performed around a certain frequency that is obtained by means of the measuring result from the first measurement.

2. The method according to claim 1, according to which the first measurement is given a high frequency resolution in that it is performed with a narrow-band waveform.

3. The method according to claim 1, according to which the second measurement is given a high range resolution in that it is performed with a broadband waveform.

4. The method according to claim 3, according to which the waveform in the second measurement is made broadband in that it consists of stepped frequency measurement.

* * * * *